United States Patent [19]

Hanaway et al.

[11] Patent Number: 4,616,661
[45] Date of Patent: Oct. 14, 1986

[54] ROCK DOOR LATCH WITH OPPOSED ROLLER DETENTS

[75] Inventors: Roger D. Hanaway, Blue Spring; Randall E. Breyer, Independence, both of Mo.

[73] Assignee: Deutz-Allis Corporation, Milwaukee, Wis.

[21] Appl. No.: 744,427

[22] Filed: Jun. 13, 1985

[51] Int. Cl.[4] .............................................. A01F 12/00
[52] U.S. Cl. .................................................. 130/27 JT
[58] Field of Search .......................... 130/27 JT, 27 R; 56/14.6

[56] References Cited

U.S. PATENT DOCUMENTS

| 3,971,390 | 7/1976 | McDuffie et al. | 130/27 JT |
| 4,195,644 | 4/1980 | Ryczek | 130/27 JT |
| 4,262,679 | 4/1981 | James | 130/27 JT |
| 4,271,850 | 6/1981 | Ryczek | 130/27 JT |
| 4,335,565 | 6/1982 | Knepper et al. | 130/27 JT |
| 4,484,588 | 11/1984 | Huhman et al. | 130/27 JT |

Primary Examiner—Paul J. Hirsch
Attorney, Agent, or Firm—Charles L. Schwab

[57] ABSTRACT

A rock door has its front end pivotally mounted on a combine near the crop inlet to the threshing cage and when closed has a pivoted lip structure at its rear end resting on the front end of the threshing concave. The lip structure is releasably held in its normal operating position by a latching mechanism employing a pair of oppositely acting spring biased roller detents engaging opposite sides of a detent finger carried by the lip structure. When a rock of substantial size is conveyed to the gap between the threshing rotor and the door, the force of the rock against the door causes the latch mechanism to release the door allowing the rock to be discharged.

3 Claims, 5 Drawing Figures

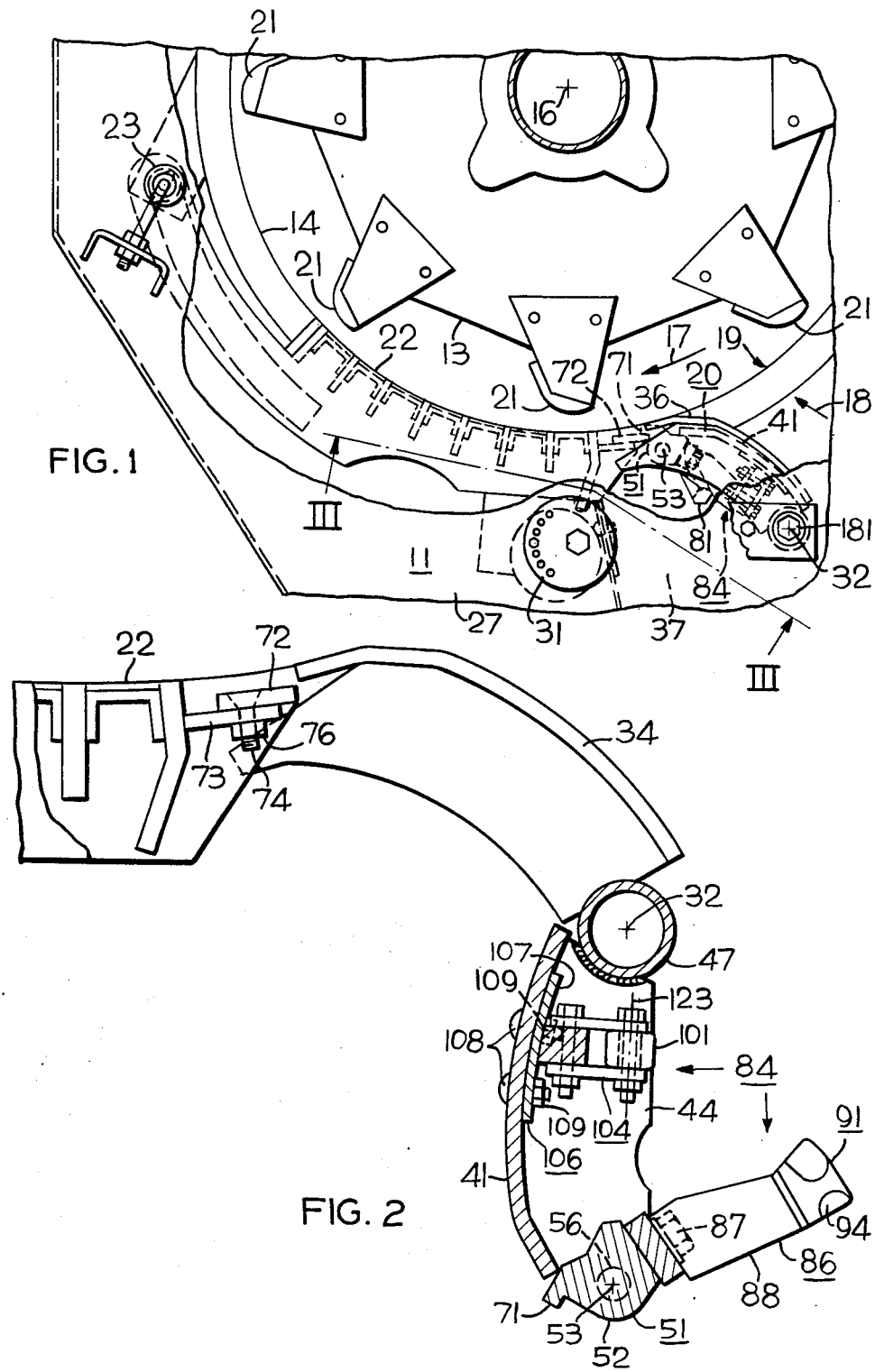

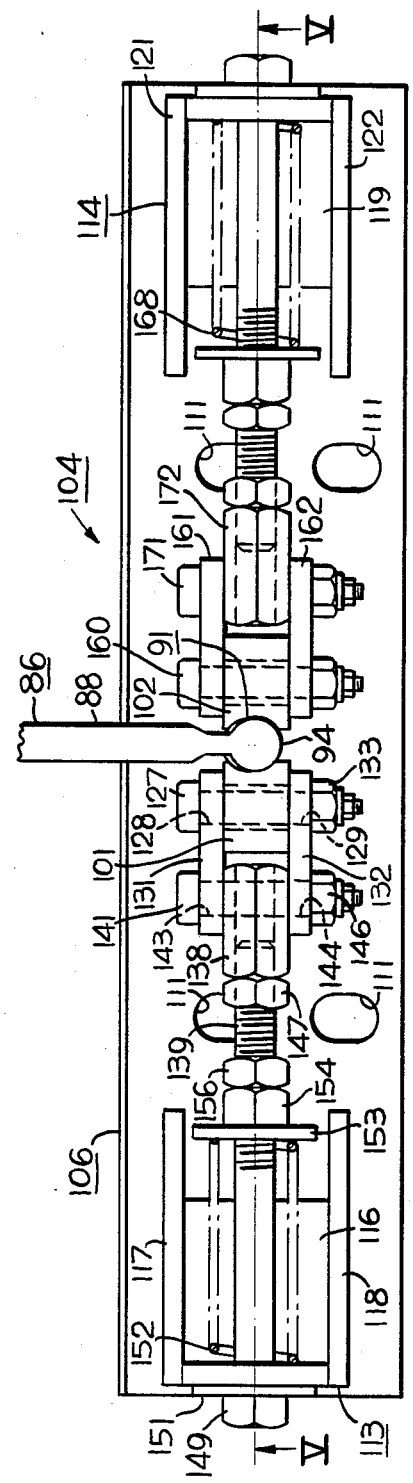
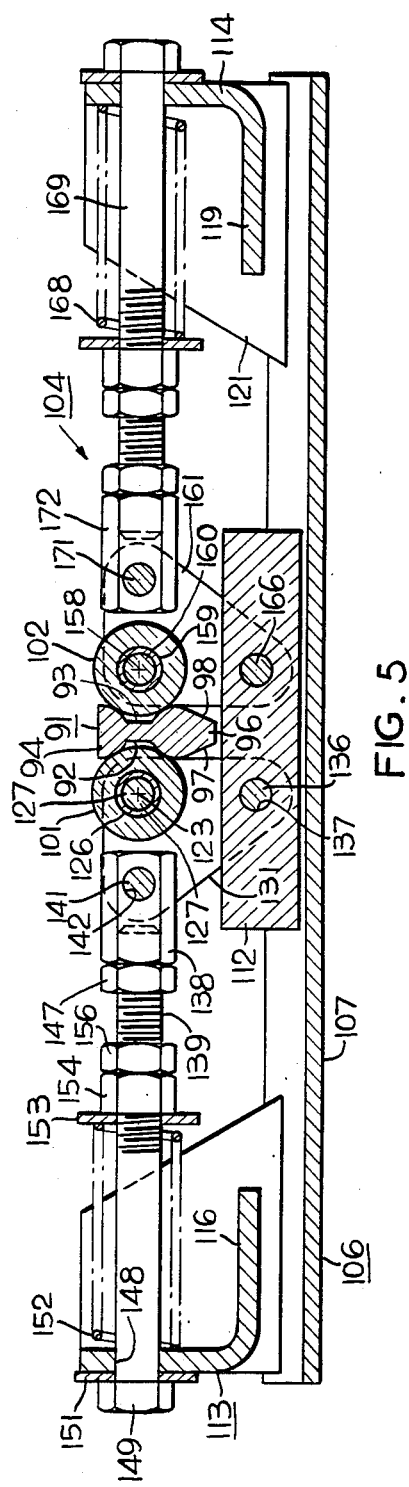
FIG. 4
FIG. 5

ROCK DOOR LATCH WITH OPPOSED ROLLER DETENTS

TECHNICAL FIELD

This invention relates to a harvester or combine of the type having a threshing rotor and a cooperating concave for effecting threshing of agricultural crops. More particularly, the invention relates to a rock door for preventing rocks or the like from entering into the space between the threshing rotor and the cooperating concave.

PRIOR ART STATEMENT

Occasionally when a combine header is operating close to the ground, the header will pick up a rock along with the crop which will be conveyed to the threshing section of the combine by the feeder mechanism. Unless the relatively large rocks are removed before they enter between the threshing rotor and the concave, extensive damage may be caused to the threshing mechanism.

Heretofore, a wide variety of rock doors have been provided to intercept rocks and the like before they pass into the space between the threshing rotor and the concave. One such rock door arrangement is shown and described in U.S. Pat. No. 4,271,850 issued on June 9, 1981 to William G. Ryczek for a "Concave Safety Door with Sealing and Latching Features". In the beforementioned patent, the rock door is hinged at its forward end and includes a pivotable detented lip, the rear edge of which rests on a forward edge of the concave. The present invention is directed to substantially improve the operation of a rock door of the type shown in the beforementioned patent.

BRIEF DESCRIPTION OF THE INVENTION

A harvester using this invention includes a threshing chamber, a crop inlet to the threshing chamber, a rotatable threshing rotor within the threshing chamber and a concave beneath the rotor having a predetermined threshing clearance with the latter. A rock door, constituting a portion of a floor of the inlet to the threshing chamber forward of said concave, includes a main body portion pivotally connected at its front end to the harvester on a first horizontal axis generally parallel to the axis of the threshing rotor and a lip structure pivotally connected to the rear of the main body portion for pivotal movement about a second horizontal axis generally parallel to the first horizontal axis between a detented operating position in which an edge of the rock door lip structure is in overlapping engagement with the front end of the concave and a tripped position in which the lip structure is disengaged from the concave. A latch mechanism carried by the rock door normally maintains the lip structure rigid with respect to the body portion of the rock door. The latch mechanism includes a finger secured to the lip structure and it extends radially therefrom relative to the second horizontal axis to present a detent part on its free end. The detent part includes a pair of radial recesses on its axially opposite sides. The latch mechanism also includes a detent mechanism releasably maintaining the finger in a predetermined latched position. The detent mechanism has this functional capability by virtue of its housing a pair of rollers with cylindrical outer rolling surfaces engaging said recesses, respectively, and resilient thrust transmitting means mounted on the main body of the door urging the rollers into engagement with the recesses.

The rollers may be rotatably mounted on levers on a first pair of parallel axes, respectively, which axes are spaced from one another in the direction of and normal to the second horizontal axis. The levers may be pivotally mounted on the main body of the door on a second pair of parallel axes, respectively, which are substantially parallel to and spaced from the first pair of parallel axes, and the resilient thrust transmitting means may be operatively connected to the levers.

BRIEF DESCRIPTION OF THE DRAWINGS

One embodiment of the invention is illustrated by the drawings in which:

FIG. 1 is a partial side view of a harvester with portions broken away for illustration purposes;

FIG. 2 is an enlarged side view of the rock door in an unlatched condition;

FIG. 4 is a bottom view of the latch mechanism for the rock door; and

FIG. 5 is a view taken along the line V—V in FIG. 4.

DETAILED DESCRIPTION OF THE DRAWINGS

Figure 3:
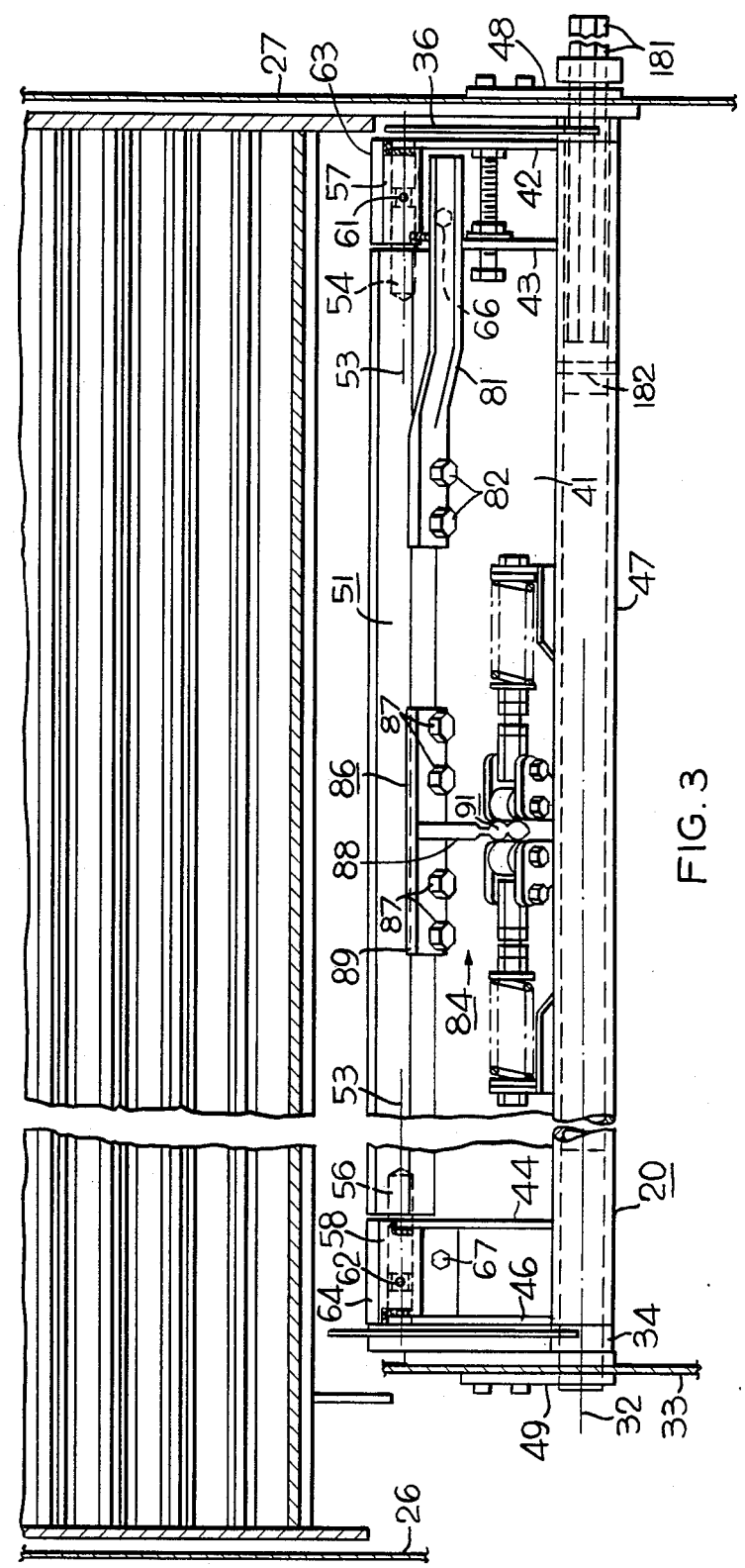
FIG. 3 is a view taken along the line III—III in FIG. 1.

Referring to FIGS. 1, 2 and 3, the harvester or combine 11 includes a threshing rotor 13 and foraminous cage 14 having a common transverse horizontal axis 16. The direction of rotation of the rotor 13 about the axis 16 is indicated by an arrow 17. A feeder mechanism, not shown, feeds crop material in the direction indicated by the arrow 18 over a rock door 20 into a cage inlet 19. The crop material passes rearwardly between the rasp bars 21 on the rotor 13 and a concave 22 which has vertical openings permitting threshed grain to fall to a cleaning section, not shown. The rear end of the concave 22 is supported on the cage 14 by a pair of transversely spaced and adjustably positioned pivots 23, only one of which is shown. The front end of the concave 22 is supported on transversely spaced and parallel vertical walls 26, 27 by adjustable supports in the form of a pair of eccentric mounts 31, only one of which is shown. The rock door 20 is pivotally mounted on a transverse horizontal axis 32 on transversely spaced and parallel vertical walls 27 and 33. A pair of pivotally mounted seals 34, 36 serve to minimize loss of grain to a rock discharge chamber 37 below the rock door 20.

The rock door 20 includes a curved or convex top plate 41 which is welded to vertically and longitudinally disposed reinforcing ribs 42, 43, 44, 46. The ribs 42, 43, 44, 46 are welded at their rear ends to a pivot tube 47 which is pivotally mounted on the parallel vertical walls 33, 27 by a pair of pivot structures 48, 49. A lip structure 51 on the rear of the rock door 20 includes a main part 52 pivotally mounted on a transverse axis 53 of a pair of pivot pins 54, 56 carried by and extending inward from hollow cylinders 57 and 58 welded to the front ends of ribs 42, 43 and 44, 46, respectively. The pins 54, 56 are held in place in the bores of the cylinder parts 57, 58 by set screws 61, 62. Relatively flexible and flat end plates 63, 64 are secured to the underside of the top plate 41 of the rock door 20 by cap screws 66, 67. The lip structure 51 is disposed transversely between the end plates 63, 64 and between the cylinders 57, 58. Thus the lip structure 51 extends across a substantial portion of the transverse width of the rock door 20 which extends across the width of the feeder, not shown, and across the width of the crop inlet opening 19 of the threshing cage 14.

The lip structure 51 includes a horizontal lip 71 at its rear end which in the latched or operating position of the rock door 20, as shown in FIG. 1, rests on the front end of a flat transverse plate 72 releasably secured to a frame part 73 of the concave 22 by screws 74 and nuts 76. A hexagonal section operating rod 81 is secured to the lip structure main part 52 by cap screws 82 and its free end is adapted to receive a socket type wrench for resetting the lip structure following a tripping condition.

The lip structure 51 is releasably held in its operating or latched condition shown in FIG. 1 by a spring biased latch means in the form of a latch mechanism 84 operatively interposed between and releasably interconnecting the main part of the door 20 and the lip structure 51. The latch mechanism 84 includes a latch finger structure 86 rigidly secured to the main part 52 of the lip structure 51 by cap screws 87. The latch finger structure includes a latch finger 88 welded at one end to a base part 89. The finger 88 extends forwardly from the main part 52 of the lip structure 51; that is, it extends in a radial direction in relation to the lip structure pivot axis 53. As shown in FIGS. 4 and 5, the free end of the latch finger 88 includes a detent part 91 having a pair of oppositely facing recesses 92, 93 between two transversely enlarged portions 94, 96. Portion 96 of the detent part 91 includes a pair of tapered camming surfaces 97, 98 which face away from one another but converge in relation to one another in a direction toward the underside of the plate 41 which is generally tangential to a circle with a center on the axis 53.

As shown in FIGS. 3, 4 and 5, the detent part 91 of the finger structure 86 is releasably held in its latched position by oppositely biased detent parts in the form of spring biased rollers 101, 102 of an opposed roller detent mechanism 104 of the latch mechanism 84. The detent mechanism 104 includes a support frame 106 having a base 107, which as shown in FIG. 2, is releasably secured to the bottom side of the top plate 41 of the rock door 20 by bolts 108 and nuts 109. The bolts extend through openings 111, shown in FIG. 4, which are elongated to permit adjustment of the position of the frame 106 relative to the top plate 41 of the rock door to compensate for manufacturing tolerances and insure proper registration or alignment of the rounded detent parts 94, 96 forming the recesses 92, 93 with the rollers 101, 102. The frame 106 includes a lever support bar 112 welded to the plate 107 and a pair of spring abutments 113, 114 welded to the plate 107 near the opposite ends of the latter. The abutment 113 includes an angle member 116 welded at its opposite ends to a pair of parallel and transversely extending plates 117, 118. Abutment 114 is similarly constructed from an angle member 119 welded to a pair of plates 121, 122 which in turn are welded to the base plate 107.

The roller 101 is supported on an axis 123 normal to axis 53 by a bushing 126 which in turn is supported on a bolt 127. The bolt 127 extends through aligned openings 128, 129 near the right angle corners of a pair of right angle triangle shaped plates or levers 131, 132 and has a threaded end engaged by a nut 133. Corresponding acute angle corners of the levers 131, 132 are pivotally mounted on the bar 112 by pivot means in the form of a bolt 136 extending through aligned openings in the levers 131, 132 and a drilled opening 137 in the bar 112. The other acute angle corner of the levers 131, 132 are pivotally connected to a nut 138, which is threaded onto the threaded end of a bolt 139, by a pivot bolt 141 extending through an opening 142 drilled in the nut 138 and through aligned openings 143, 144 in the parallel levers 131, 132. A nut 146 threadedly engages the end of the bolt 141 and a lock or jam nut 147 prevents relative rotation of the nut 138 from its desired position of adjustment on the bolt 139. The bolt 139 extends through an opening 148 in the angle part 116 of the abutment 113 and the head 149 of the bolt 139 is in axial thrust transmitting engagement with the abutment 113 through a thrust washer 151. A detent roller biasing means in the form of a coil compression spring 152 surrounds the shank of the bolt 139 and has one axial end in abutment with the abutment 113 and its other axial end in axial thrust transmitting engagement with the bolt 139 through a thrust washer 153 and a nut 154 threadedly engaging the threaded portion of the bolt 139. A jam nut 156 prevents relative rotation between the nut 154 and the bolt 139. The axial thrust exerted by the detent roller 101 against the latch can be adjusted by loosening the jam nut 156 and then adjusting the axial position of the nut 154 on the bolt 139. At the time of installation, the roller 101 is brought into proper detent position with the recess 92 of the detent part 91 by turning the bolt 139, after the jam nut 147 has been loosened, to permit relative rotation between the bolt 139 and the nut 138.

The spring biased roller 102 is similarly supported on an axis 158 normal to axis 53 by a bushing 159 and a bolt 160 on a pair of parallel levers 161, 162 which are pivotally supported on the bar 112 by a bolt 166 parallel to the bolt 136. A resilient thrust transmitting means in the form of a coil spring 168 urges a bolt 169 to the left as viewed in FIGS. 4 and 5 and, thus, the levers 161, 162, to which the bolt 169 is pivotally connected by a bolt 171 extending through a nut 172 on the end of the bolt 169, are urged to pivot about the bolt 166. The compression coil springs 152, 168 urge the rollers 101, 102 into opposed thrust transmitting engagement with the transversely opposite sides of the detent part 91. Since the rollers 101, 102 are disposed in the recesses 92, 93 of the detent part 91, the finger is resiliently held against pivotal movement about the lip structure pivot axis 53.

OPERATION

When the combine is harvesting a crop, the rock door 20 is in its latched position as shown in FIGS. 1 and 3 wherein the top plate 41 of the door 210 is a floor over which the crop material is conveyed into the cage 14 via the inlet 19. If a stone of predetermined size should be conveyed to a position on the top of the door 20, a rasp bar 21 of the rotor 13 will contact the stone causing the stone to exert downward thrust against the door at a point rearwardly of the door pivot axis 32. The vertical load at the rear of the rock door 20 is carried by the lip 71 of the lip structure 51. Accordingly, the lip structure 51 is urged to pivot clockwise about its axis 53 thereby causing the detent part 91 of the finger 84 to come out from between the opposed spring biased rollers 101, 102. Although the flexible plates 63, 64 engage the top side of the concave plate 72 to seal against loss of grain, they are designed to readily deflect to permit the rock door 20 to drop should a rock cause the rock door latch mechanism 84 to unlatch or trip. When the finger 86 disengages from the rollers 101, 102, the door 20 will pivot about its transverse axis 32 and drop to the position shown in FIG. 2 and the stone will fall into a rock chamber 37. A signal device, not shown, will alert the combine operator of the open rock door condition and he will stop the combine and close the rock door. Closing the rock door 20 is accomplished by placing a wrench on a hexagonal section rod 181 (whose inner end is secured by the tube 47 by a pin 182) and turning the rod 181 clockwise as viewed in FIG. 1 to pivot the door 20 to place the lip 71 above the concave plate 72. Then a wrench is placed on the end of the hex rod 81 and the lip structure 51 is pivoted counterclockwise about the lip pivot axis 53 bringing the lip 71 into contact with the top of the concave plate 72 and causing the finger 88 to latch with the rollers 101, 102. By using rollers 101, 102 as detent parts, the round outer surface of the rollers act as a camming surface as the rollers turn on their axes 123, 158 during latching or tripping. Thus, there is rolling contact between the finger detent part 91 and the cooperating detent parts in the form of rollers 101, 102. Sliding friction in the latching mechanism is further reduced by using pivotable levers 131, 132 and 161, 162 to support the roller detents 101, 102. It is believed the latching mechanism of this invention provides consistent release of the rock door in response to rock imposed pressure or thrust on the rock door and is less likely to malfunction upon being subjected to the dirt and grit encountered during a harvesting operation.

The embodiments of the invention in which an exclusive property or privilege is claimed are defined as follows:

1. A harvester having a threshing chamber, a crop inlet to the threshing chamber, a rotatable threshing rotor within the threshing chamber and a concave beneath the rotor having a predetermined threshing clearance with the latter, characterized by
   a rock door constituting a portion of a floor of the inlet to the threshing chamber forward of said concave, said rock door including
      a main body portion pivotally connected at its front end to the harvester on a first horizontal axis generally parallel to the axis of said threshing rotor and
      a lip structure pivotally connected to the rear of the main body portion for pivotal movement about a second horizontal axis generally parallel to said first horizontal axis between a detented operating position in which an edge of said lip structure is in overlapping engagement with the front end of said concave and a tripped position in which said lip structure is disengaged from said concave, and
   a latch mechanism carried by said safety door for normally maintaining said lip structure rigid with respect to said body portion including
      a finger secured to said lip structure and extending radially in relation to said second horizontal axis and presenting a detent part on its free end having surfaces defining a pair of recesses on axially opposite sides thereof and
      a detent mechanism releasably maintaining said finger in a predetermined latched position including
         a pair of rollers having round outer rolling surfaces engaging said surfaces defining said recesses, respectively, and
         resilient thrust transmitting means on said main body urging said rollers into engagement with said recesses.

2. The harvester of claim 1 wherein said detent mechanism includes
   levers rotatably mounting said rollers on a first pair of parallel axes, respectively, which are spaced from one another in the direction of and are normal to said second horizontal axis,
   means pivotally mounting said levers on said main body on a second pair of parallel axes, respectively, which are substantially parallel to and spaced from said first pair of axes, and
   means operatively connecting said resilient thrust transmitting means to said levers.

3. The harvester of claim 2 wherein said thrust transmitting means includes a pair of opposed compression springs operatively associated with said levers.

* * * * *